(No Model.)  T. G. COOK.  2 Sheets—Sheet 1.
SULKY HARROW.
No. 288,164.  Patented Nov. 6, 1883.
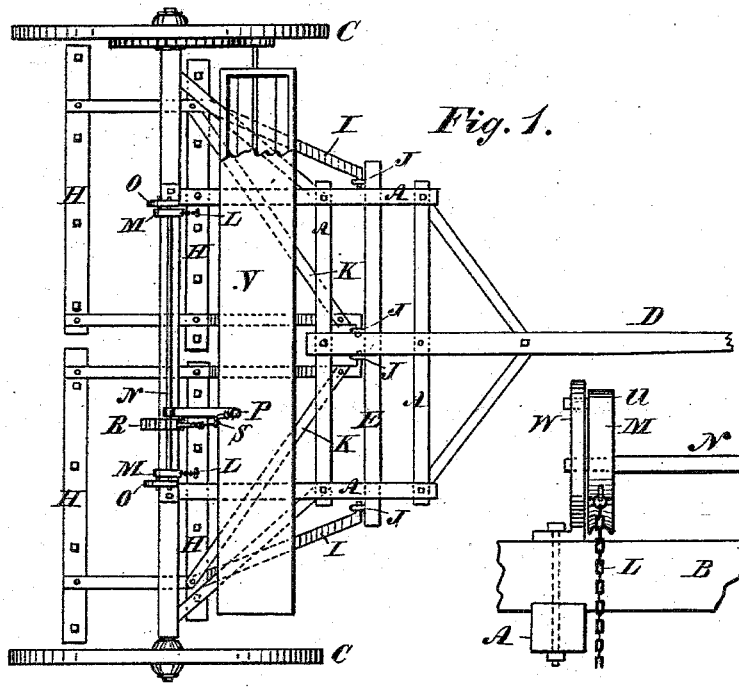
Fig. 1.
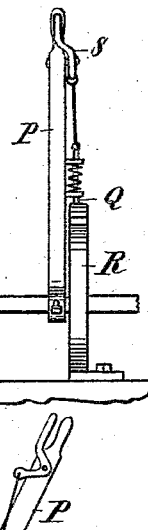
Fig. 4.
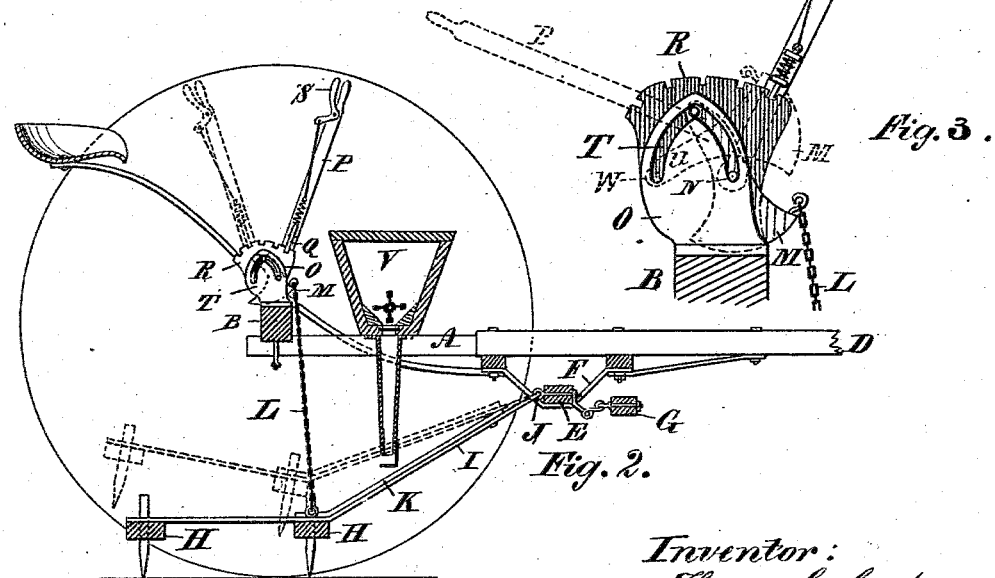
Fig. 3.
Fig. 2.
Witnesses:
John Grist
Arthur A. Powell
Inventor:
Thomas G. Cook
By Henry Grist
Attorney.

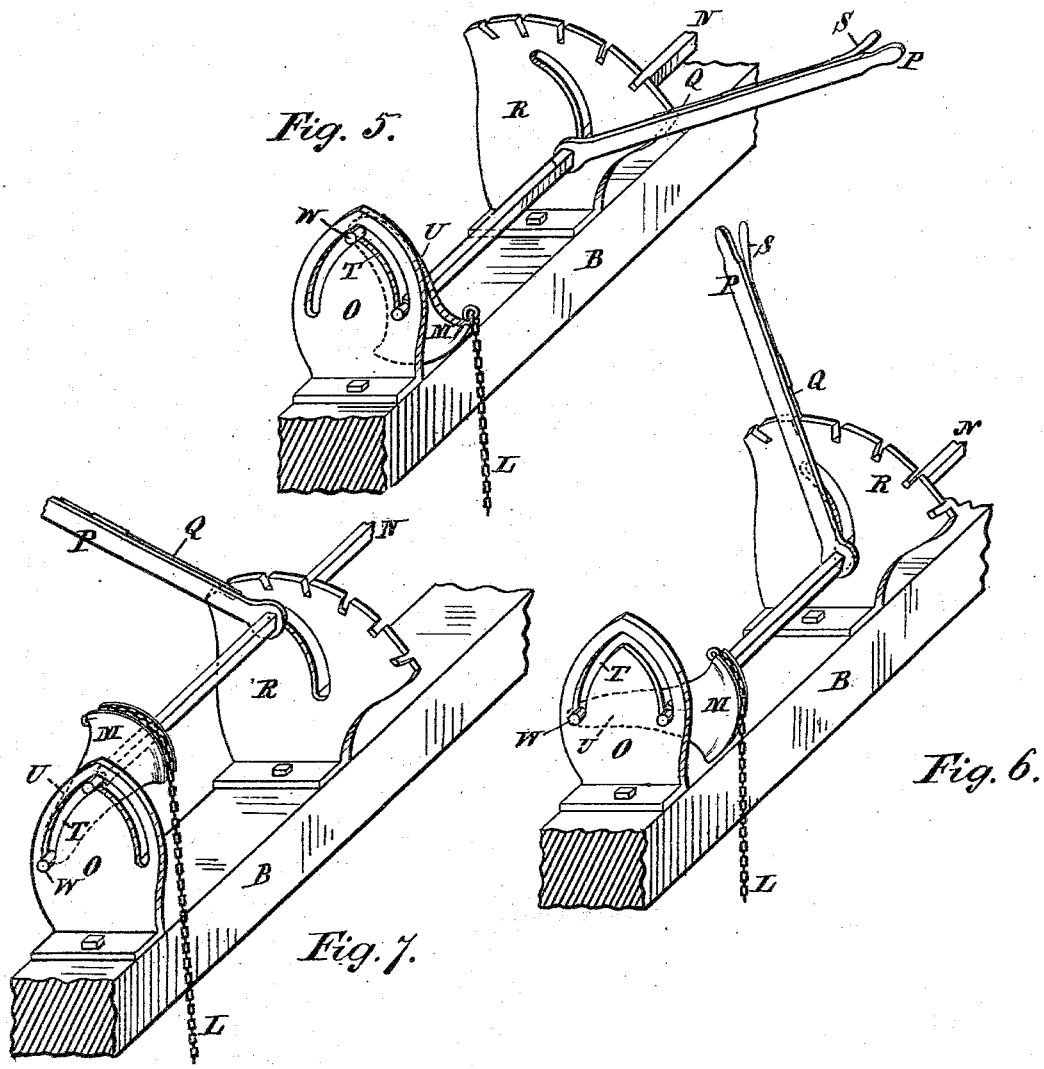

UNITED STATES PATENT OFFICE.

THOMAS G. COOK, OF BROCKVILLE, ONTARIO, CANADA, ASSIGNOR OF ONE-HALF TO JAMES WALTER MANN, OF SAME PLACE.

SULKY-HARROW.

SPECIFICATION forming part of Letters Patent No. 288,164, dated November 6, 1883.

Application filed November 1, 1882. (No model.)

*To all whom it may concern:*

Be it known that I, THOMAS GRIER COOK, of Brockville, in the county of Leeds and Grenville, in the Province of Ontario, Canada, have invented certain new and useful Improvements in Sulky-Harrows; and I do hereby declare that the following is a clear and exact description of the same.

The object of this invention is to attach removably to a sulky-frame, with or without a seed-box, a drag-harrow in two sections, which are simultaneously lifted from the ground by a lever, and hinged to a draft-bar bracketed under the sulky-frame, whereby the draft will be in a direct or nearly direct line from the neck of the team to the sections of the harrow, the sections prevented from swaying against the wheels, the harrows have sufficient play to follow the irregularities of the ground, and be detachable from the sulky-frame.

My invention consists in means for lifting the harrow-sections from the ground simultaneously by chains attached to quadrants on a shaft supported from the axle of the sulky, said quadrants being provided with a bent arm, which enters a Gothic-shaped slot in the bearing supporting the shaft, so that by first rocking the shaft by a lever the chains lift the harrow-sections, and then the shaft, quadrants, chains, and harrow-sections are bodily lifted by a continued depression of the lever.

Figure 1 is a top view of my sulky-harrow with seed-hopper attached. Fig. 2 is a vertical section of the same enlarged. Fig. 3 shows the lifting mechanism in position when harrowing, and its position in dotted lines when the harrow-sections are lifted from the ground. Fig. 4 is a partial elevation of the same. Fig. 5 is a perspective view of part of lifting mechanism, showing position when the harrows are lowered. Fig. 6 is a like view, showing position when the harrows are partly hoisted; and Fig. 7 is a like view after lifting the harrows clear of the ground.

A is the sulky-frame, secured to axle B of the ground-wheels C, and provided with a draft-tongue, D, in the usual manner.

Under frame A is fixed a draft-bar, E, bearing in brackets F, and to the middle of said bar is hooked the equalizing-bar G, to which the whiffletrees are attached in the usual manner.

H H are parallel bars of the harrow, constructed in two sections, each section connected to bar E by iron straps I I, which are bent upwardly to connect by a square hook horizontally entering an eye, J, secured in bar E, whereby the harrow-sections will be attached hingedly, to lift off the ground when required, and by the retention of the hook in the eye and the rigidity of the bars be prevented from laterally swinging against the wheels of the sulky when harrowing or in use.

The bar E is hung sufficiently low to be in a position in line or nearly in line with the harrow-teeth and the draft attachment on the collar on the necks of the horses, whereby the draft will be direct, and thereby make the draft easy. The lateral rigidity of the harrow-sections is increased by diagonal braces K—one end secured at the bend of the straps I, and the other end to near their upper ends. By constructing the harrow in two sections, each section will have sufficient play vertically to follow the pitch of a furrow or other irregularity of the ground. The harrow-teeth are attached to the bars H H, and may be either curved or straight or other suitable form.

The harrow-sections are raised simultaneously by chains L—one end attached to the middle of one of the front bars H, and the other end to a quadrant, M, near the ends of a shaft, N, mounted to rock in bearings O, secured to the axle B. Said shaft N is provided with a lever, P, having a spring-bolt, Q, endwise engaging with a rack, R, secured to axle B, and operated by a bent lever, S, in the usual manner, for lifting the harrow-sections, whereby the teeth will suit the depth of tillage, but not sufficiently high to lift them clear of the ground, such being effected in the manner now to be described.

The bearings O of shaft N are slotted upwardly, curving to the rear, and thence downwardly, making a Gothic-shaped slot, T, therein, the rock-shaft N bearing on the lower end of the former portion of the slot.

The quadrants M have an arm, U, rearward from the shaft N, on which they are keyed, said arm U having a projection, W, at a right angle, and entering the rear portion of the slot T, so that when the harrow is tilling the projection U will be at the apex of the slot; but when the shaft is rocked by the lever to lift the teeth to the highest point of tillage the projection W will thereby be brought down to the lower end of the arc on a plane with the end of shaft N. Then, by further depressing lever P, the fulcrum will be transferred from shaft N to the projection W, and the shaft, chains, and harrow-sections will be lifted bodily, whereby the teeth of the latter will be lifted clear of the ground, and maintained by the end of the spring-bolt Q engaging with the rack R, as before described.

This machine, when provided with a hopper, V, of a seed-sower patented by J. W. Mann, August 22, 1882, makes a very effective and cheaply-constructed seed-sower and harrow combined.

I claim as my invention—

The combination, with shaft N, provided with lever P, of the quadrants M, having a rearward arm, U, and projection W therefrom, entering a Gothic-shaped slot, T, in bearings O, carrying said shaft N, whereby the fulcrum of lever P is transferred from the shaft to the projection from the arms of the quadrants, for lifting the harrow-sections from the ground by raising shaft N, as set forth.

THOMAS G. COOK.

Witnesses:
G. C. CULFORD,
W. E. ROBINSON.